(12) United States Patent
Loughran et al.

(10) Patent No.: US 7,843,910 B2
(45) Date of Patent: Nov. 30, 2010

(54) DECIPHERING ENCAPSULATED AND ENCIPHERED UDP DATAGRAMS

(75) Inventors: Kevin Loughran, Castleblaney (IE); David Nolan, Celbridge (IE); Paul Hough, Birr (IE); Philip Pinto, Milton Keynes (GB)

(73) Assignee: Hewlett-Packard Company, Palo Alto, CA (US)

(*) Notice: Subject to any disclaimer, the term of this patent is extended or adjusted under 35 U.S.C. 154(b) by 1169 days.

(21) Appl. No.: 11/069,798

(22) Filed: Feb. 28, 2005

(65) Prior Publication Data

US 2006/0174108 A1 Aug. 3, 2006

(30) Foreign Application Priority Data

Feb. 1, 2005 (GB) ................. 0502006.0

(51) Int. Cl.
*H04L 12/28* (2006.01)
*H04L 29/06* (2006.01)
*H04J 3/00* (2006.01)
(52) U.S. Cl. .................. 370/389; 370/401; 370/521; 709/229; 713/160
(58) Field of Classification Search ......... 370/389–395, 370/351, 352, 235, 260, 466, 467, 471, 393, 370/401–428, 521–550; 714/758–776, 807; 713/150–160; 709/221–229
See application file for complete search history.

(56) References Cited

U.S. PATENT DOCUMENTS

| | | | | |
|---|---|---|---|---|
| 5,161,193 A * | 11/1992 | Lampson et al. ............ 713/151 |
| 5,235,644 A * | 8/1993 | Gupta et al. ................. 713/161 |
| 5,541,995 A * | 7/1996 | Normile et al. ............... 380/42 |
| 5,583,940 A * | 12/1996 | Vidrascu et al. ............. 713/151 |
| 5,594,869 A * | 1/1997 | Hawe et al. .................. 713/152 |
| 5,815,516 A * | 9/1998 | Aaker et al. ................. 714/807 |
| 6,279,140 B1 * | 8/2001 | Slane .......................... 714/807 |
| 7,209,491 B2 * | 4/2007 | Zheng et al. ................. 370/477 |
| 7,398,386 B2 * | 7/2008 | Kessler et al. ............... 713/150 |
| 2003/0163577 A1 * | 8/2003 | Moon et al. .................. 709/229 |
| 2004/0001508 A1 | 1/2004 | Zheng et al. |
| 2004/0161105 A1 * | 8/2004 | Park et al. ...................... 380/28 |
| 2004/0218623 A1 * | 11/2004 | Goldenberg et al. ......... 370/463 |
| 2006/0126827 A1 * | 6/2006 | Milleville ...................... 380/28 |
| 2007/0242683 A1 * | 10/2007 | Pelletier et al. ............. 370/401 |
| 2007/0242703 A1 * | 10/2007 | Pelletier et al. ............. 370/521 |

FOREIGN PATENT DOCUMENTS

WO WO 2004/040862 AQ 5/2004

OTHER PUBLICATIONS

Search Report for Application No. GB0502006.0.

* cited by examiner

*Primary Examiner*—Man Phan

(57) ABSTRACT

Deciphering and verification of the checksum of enciphered and encapsulated UDP datagrams, particularly those which enclose a tunneling protocol such as L2TP, are achieved by the provision of a checksum verifier in parallel with a decipher block. Checksum logic creates a pseudo UDP header needed for checksum verification using fields that would occur at the start of the packet that encapsulates the UDP datagram. The first part of the packet to be deciphered is the UDP header; checksum logic can latch the checksum field into a local register. As the rest of the packet is deciphered the checksum verifier processes the data at the same time. Eventually the checksum logic will acquire a complete checksum which can be compared with the checksum that had been previously latched, so as to verify the checksum.

9 Claims, 3 Drawing Sheets

DECIPHERING ENCAPSULATED AND ENCIPHERED UDP DATAGRAMS

FIELD OF THE INVENTION

This invention relates to packet-switched communication networks. It more especially relates to the reception of datagrams conforming to the UDP (User Datagram protocol), encapsulated and enciphered within a packet conforming to another transport-layer protocol, such as IP (Internet Protocol) and more particularly to such datagrams which are carriers for a tunneling protocol such as L2TP (Layer 2 Tunneling Protocol).

BACKGROUND TO THE INVENTION

Modern communication practice has seen the development of virtual private networks (VPNs), which are useful for an organization which desires to provide a secure communication system within the organization but, owing for example to the geographical separation of parts of the organization, cannot conveniently employ a private local area network (LAN) separated from external networks by secure gateways or firewalls. One way in which a VPN can be organized is to employ datagrams which employ UDP as a transport protocol and a tunneling protocol such as L2TP, and to encapsulate datagrams using a enciphering protocol within packets that can be transported generally, i.e. packets conforming to an internetworking protocol (usually IP). The encapsulation may, where the overall transport protocol is IP, be an IPSEC (IP Security) protocol such as AH (Authentication Header) or ESP (Encapsulation Security Protocol). The former provides source authentication and data integrity but the latter provides, at the cost of greater complexity, confidentiality as well. In what follows it will be assumed that ESP is employed as an enciphering protocol but it will be understood that the invention extends to the decoding of UDP datagrams which are encapsulated by means of other enciphering protocols and which carry payloads via other tunneling protocols.

When a UDP datagram is prepared for transmission from a sender there is a computation of a checksum. A UDP checksum is computed by performing a 1's complement of the sum of all the 16-bit words in the entire UDP datagram and a pseudo-header (ignoring any overflow). The result is put into the checksum field of the UDP header.

The purpose of the checksum is to provide for error checking in the event that one of more of the links between source and destination does not provide error checking. If the datagram reaches the destination without error, the sum of the 16-bit words in the UDP datagram added to the checksum should provide in the absence of error a result consisting of all 1 s. If any bit in the result is a zero the datagram is in error and may be discarded.

When therefore a UDP datagram encapsulated in a packet reaches the end of a tunnel defined by the tunneling protocol, the receiver at or defining the end of the tunnel must first decipher the packet, using the relevant (secret) deciphering key. It is then necessary to verify the UDP checksum.

Any method of deciphering requires the use of memory. If shared memory is used for deciphering and the verification of the checksum, the whole packet (i.e. the datagram and its encapsulation) is read into memory and deciphered; then the checksum is verified. Such a process requires a lot of time (clock cycles) first to decipher the full packet and then to run through it again to verify the checksum. It limits the number of tunnels a system can terminate in a given time. Moreover the latency also increases.

If separate memories are used for deciphering and the verification of the checksum, the packet is decoded fully in one memory and then passed onto another memory wherein the checksum would be verified. Such a scheme requires extra memory, because each memory must be large enough to accommodate a packet of maximum size; again, with consecutive functions, there is an increase of the latency of tunnel termination. Such an increase is a serious disadvantage, especially if voice data is being tunneled through a VPN.

SUMMARY OF THE INVENTION

The object of the invention is therefore to improve the deciphering and verification of the checksum of enciphered UDP datagrams, particularly those which enclose a tunneling protocol such as L2TP.

This is achieved by the provision of a checksum verifier in parallel with the decipher block. Checksum logic creates a pseudo UDP header needed for checksum verification using fields that would occur at the start of the packet. The first part of the packet to be deciphered will always be the UDP header and checksum logic can latch the checksum field into a local register. As the rest of the packet is deciphered the checksum verifier processes the data at the same time. Eventually the checksum logic will acquire a complete checksum which can be compared with the checksum that had been previously latched, so as to verify the checksum.

Further features of the invention will be described with reference to the drawings.

DETAILED DESCRIPTION

Figure 1:
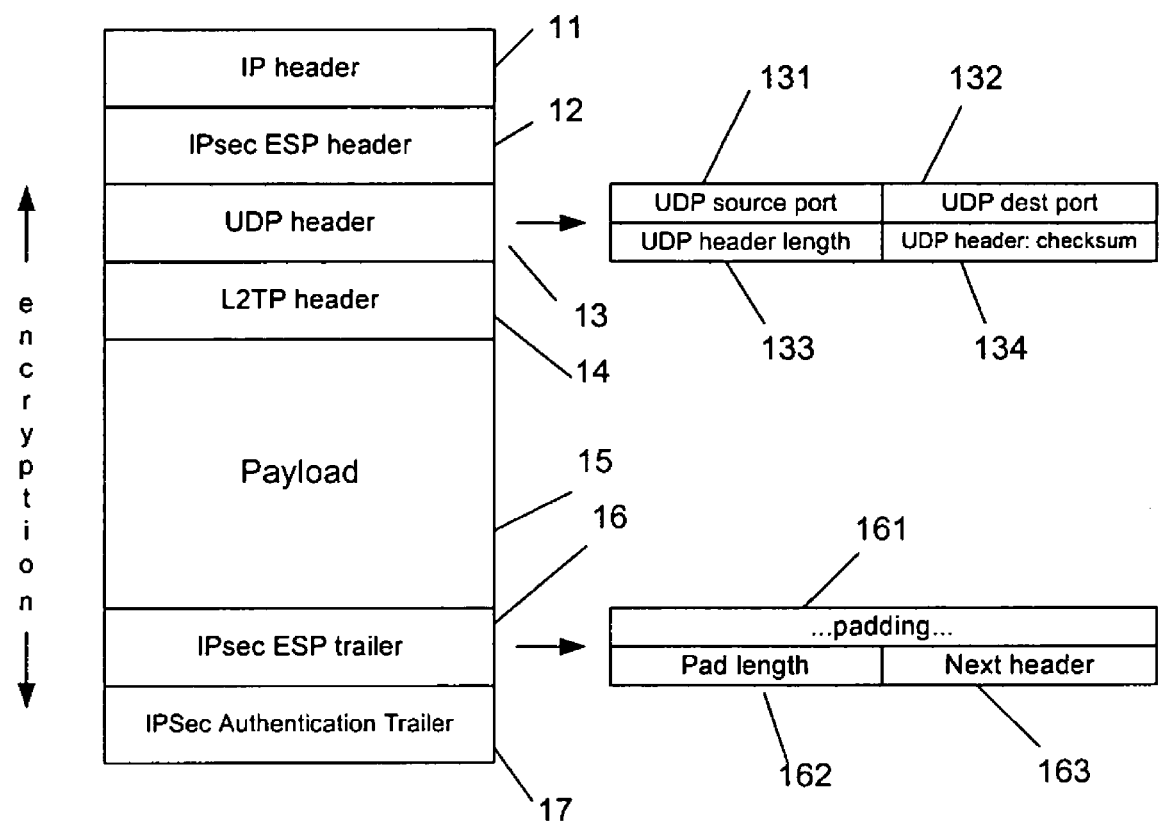
FIG. 1 is a schematic illustration of a packet employing L2TP sent over UDP encapsulated by IPSEC for sending over IP.

FIG. 1 of the drawings illustrates the structure of a packet which employs a tunneling protocol (specifically, L2TP) and which is to be sent over a transport protocol in a virtual private network. Such a packet is in this example intended for sending over a public network, i.e. the Internet and therefore the packet commences with an IP header 11 and an IPSec header 12. The virtual private network employs UDP as a transport protocol and L2TP (layer 2 transmission protocol) as a tunneling protocol. This usage accounts for the UDP header 13 and the L2TP header 14. The UDP header comprises a UDP source port number 131, a UDP destination port number 132, a length field 133 and a checksum 134. The datagram represented by the UDP header, the L2TP header and a payload 15 is encapsulated by means of an IPSEC protocol and in this particular example by means of the Encapsulation Security Payload (ESP) protocol. This protocol provides authentication, data integrity and confidentiality, specifically by enciphering between an ESP header and an IPSEC authentication trailer. Currently IPSEC authentication, for both the ESP protocol in the example and the AH (Authentication Header) protocol, uses an HMAC (Hashed Message Authentication Code) which relies on a shared secret key rather than public keys; however, the type of key is not relevant to the present invention.

The transmission protocol header, in this example the IP header 11, includes an identification of the transport protocol which the packet employs. This is done for an IPv4 packet by setting the 'higher-level protocol' field (the $10^{th}$ byte of the IP header) to a number which conventionally identifies the transport protocol, i.e. '50' to denote the ESP protocol. For an IPv6 packet, the same value (50) would be set into the 'Next header' field (the seventh byte) to denote the ESP protocol. The IPSec ESP header 12 conventionally consists of a 32-bit field called the SPI (Security Parameter Index) field and a 32-bit Sequence Number field. The SPI field in combination with the network destination address and the security protocol uniquely identifies a Security Association (SA) for the datagram. The sequence number is initially set to zero at the establishment of a Security Association and is employed to inhibit intrusion (for example by 'man-in-the-middle' attacks).

The ESP trailer field 16 includes the protocol number that identifies the transport protocol (in this case UDP) of the encapsulated datagram.

The UDP header, the tunneling protocol trailer, the payload and the encapsulation protocol trailer (in this case the ESP trailer) are enciphered. The enciphering includes the protocol number so that an intruder should not be able to determine that UDP is the transport protocol.

The authentication trailer 17 terminating the packet is a variable-length field containing a signed message digest, computed for example by some suitable algorithm, such as MD5 (Message Digest 5) or SHA (Secure Hash Algorithm).

When a packet of the kind shown in FIG. 1 reaches its destination in the virtual private network, i.e. it reaches the end of the L2TP/IPSEC tunnel, the receiver has to decode the packet, using whatever decryption key has been agreed for the VPN over the IPSEC protocol, and to verify the UDP checksum. Unlike some other protocols, UDP requires that the whole datagram (rather than just the header) be processed for the checksum to be verified.

Checksum verification of a UDP datagram at a receiver customarily requires the following steps:

(a) add a pseudo-header to the UDP user datagram. This pseudo-header is defined by the UDP protocol and conventionally includes the IP source address, the IP destination address and transport protocol from the IP header and the length field from the UDP header;

(b) add padding if needed to make data 16-bit aligned (c) divide the total bits into 16-bit sections (d) add all 16-bit sections using one's complement arithmetic (e) complement the result (f) if the result matches the checksum in the UDP header, the checksum is verified. If so, the pseudo-header and any added padding are discarded and the packet is accepted, for example for further forwarding or other processing. If not, the packet should be discarded.

As has been previously explained it is possible to employ separate memories for decoding and the examination of the UDP checksum. A packet is received at an input (for example a port of a network unit) and passed to a cipher memory coupled to a cipher block. The deciphered packet is loaded into the checksum memory while a checksum block determines the checksum; the packet; the packet, on the assumption that the checksum is correct, is passed on for processing and/or forwarding by the unit.

An initial time interval is occupied by the deciphering of the whole packet by the cipher block. Only when the deciphering is complete is packet transferred to the checksum memory and processing is complete at the end of a second interval. The next packet can be deciphered in the cipher memory block during the second interval but the process inevitably introduces latency and requires double the memory space.

It is also possible to employ a shared memory. It is acted on in consecutive intervals first by a cipher block and then by a checksum block. Although this scheme uses half the memory space as the previous scheme, it is obviously much slower because the memory cannot be used for the next packet until the processing of the current packet has been completed. Furthermore, the technique is unnecessarily time consuming, because it is necessary first to decode the full packet for IPSEC and then to run through the packet again after the decode to verify the checksum. The technique limits the number of tunnels a system can terminate per second.

Figure 2:
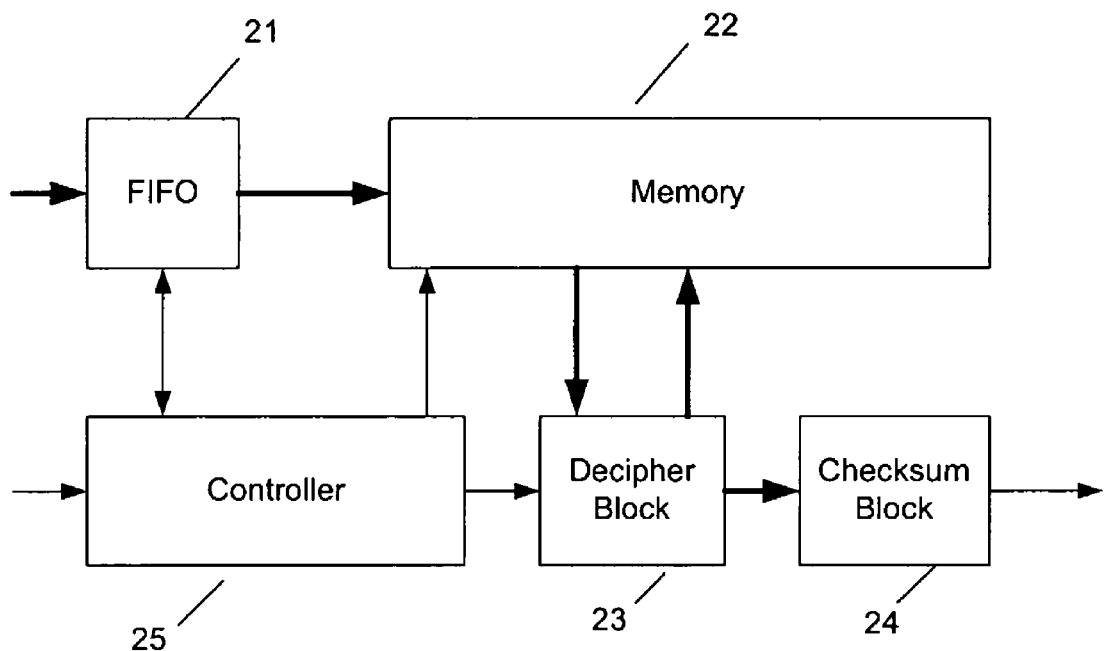
FIG. 2 illustrates a security block according to the invention.
Figure 3:
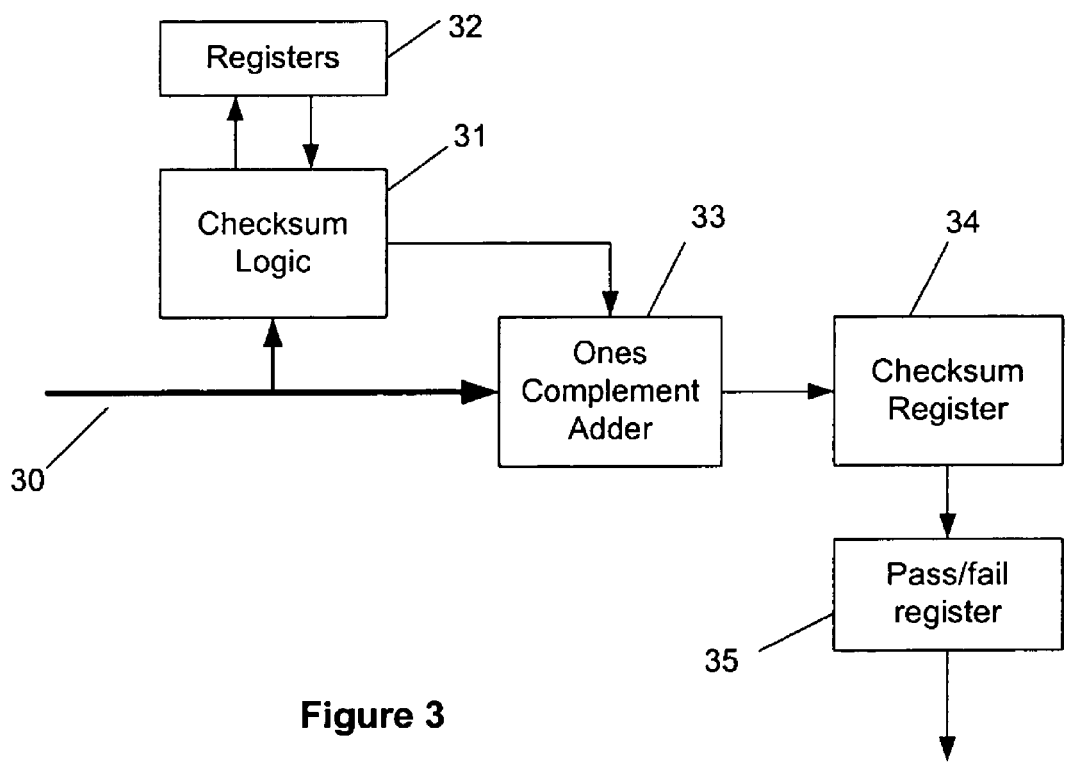
FIG. 3 illustrates a checksum verifier.
Figure 4:
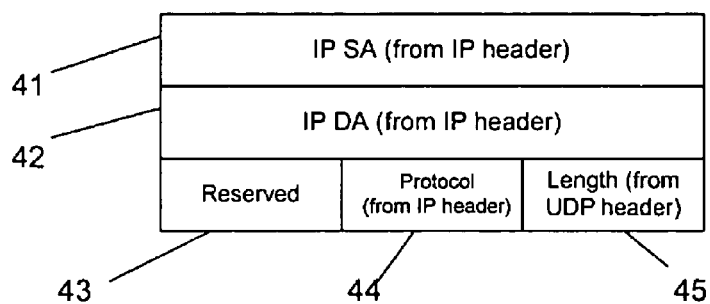
FIG. 4 illustrates a pseudo-header.

FIG. 2 illustrates generally one embodiment of the invention. FIG. 3 illustrates a checksum verifier block that forms part of the embodiment more generally shown in FIG. 2. FIG. 4 illustrates a pseudo-header employed in the technique to be described and FIG. 5 is a flow diagram.

Figure 5:
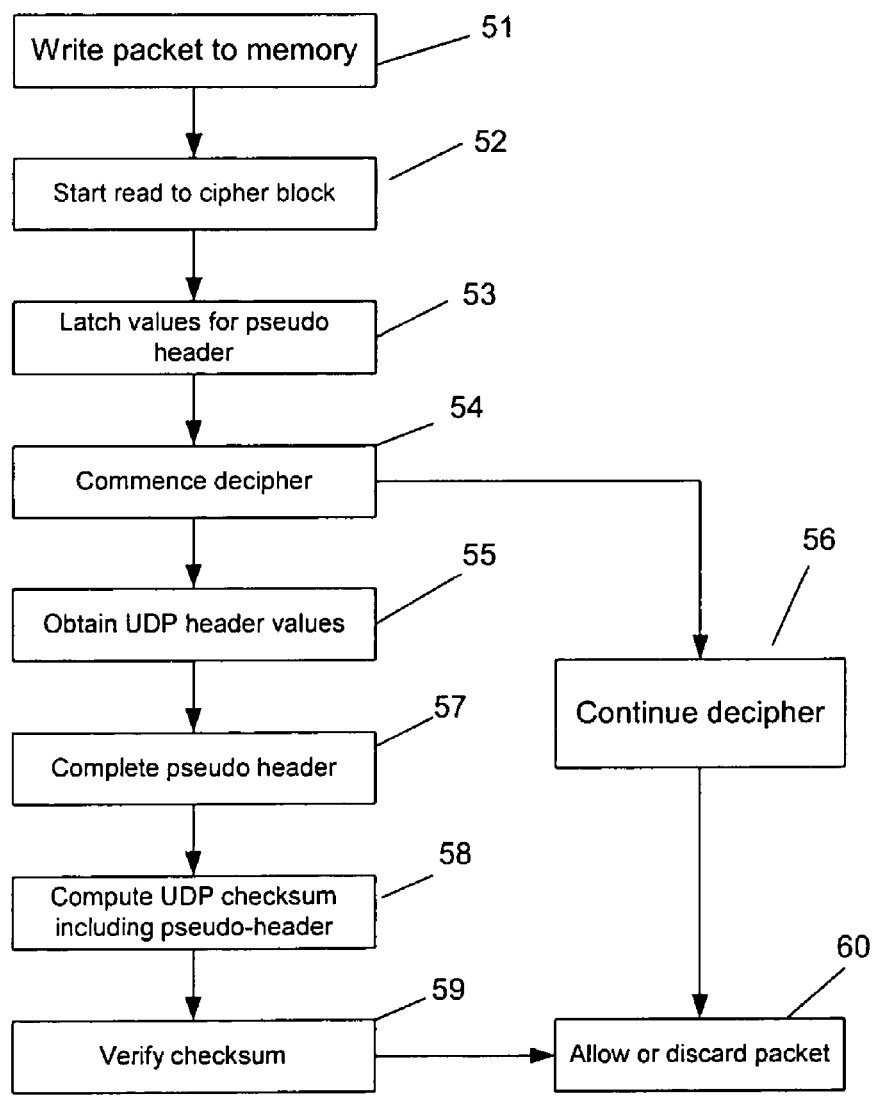
FIG. 5 is a flow diagram which illustrates the method of the invention.

As is shown in FIG. 2, a packet is received by way of a Fifo 21 and written into a memory block 22 (Stage 51, FIG. 5). Coupled to the memory is a decipher block 23, which progressively deciphers the packet and returns the deciphered packet back to the memory 22. In parallel with the return path from the decipher block 23 to the memory 22 is a checksum block 24. A controller 25 controls the reading of data to and from the memory and also provides an enable signal to the decipher block at a particular stage in a received packet.

The checksum verifier, as shown in FIG. 3, receives data at an input 30 and couples the data to a checksum logic circuit 31 (coupler to registers 32) and to a ones-complement adder 33. The adder 33 is coupled to a checksum register 34 which can signal a pass/fail register 35.

The system allows, as will now be described, deciphering and checksum verification to proceed in parallel.

Before the technique is described, it is relevant to mention that algorithms, such as DES-CBC (Data Encryption Standard—Cipher Block Chaining) used for enciphering in the present context are block ciphers which operate on a segment of data at a time. Typically the segment size is 64, 128 or 256 bits. This allows progressive deciphering a block at a time. Further, it will be understood that it is desirable to provide pre-filtering to ensure that only IPSEC packets are sent to the deciphering logic. This is readily achievable because the enciphered part of the packet occurs after the IPSEC header and the IPSEC header will indicate the type of the IPSEC packet.

The packet is passed from the memory into the IPSEC logic (the decipher block 23) in segments one at a time (the size depending on the cipher used). Since the first part of the packet (the IP header and the IPSec ESP header are not encrypted, the controller 25 will inhibit the decipher block 23 from deciphering until the correct point in the packet is reached. From the IPSec header the type of IPSec packet can be determined and accordingly how many bytes into the packet the ciphered section starts.

The checksum logic 31 creates the pseudo UDP header needed for checksum verification using some of the fields in the outer IP Header that would be at the top of the packet. To do this it will latch into registers 32 the IPSA, IPDA and IP protocol fields obtained form the IP header (stage 53, FIG. 5) and wait for the deciphered UDP length field. The 'reserved' field is set to zero. The pseudo UDP header can be added at any time, conveniently at the end of the packet, to the packet data to complete the computation of the checksum.

The first part of the packet to be decoded by the decipher block 23 in this mode will always be the UDP header. As the decoded data comes out, the checksum logic 31 will complete the pseudo-header (stages 55 and 57, FIG. 5), create the checksum field and latch it into a checksum register 34. This field is zeroed in the packet (so that the checksum is set to 16×0) and then the data is passed through the checksum verifier.

As the rest of the packet is deciphered (stage 56, FIG. 5) the checksum verifier will process the data simultaneously.

When it comes to the ESP trailer which can include some of the data as well as padding, a pad length and next header fields, the checksum logic will have to work out if, and so, what part of it is actual packet data. This may be done by subtracting from the length field in the IP header the length of the IPSec header; the result is the length of the packet. A simple computation then gives the number of bytes required to align the packet to 16 bits.

The checksum logic should now have a complete checksum in the checksum register 34. This is then compared to the checksum that was previously latched and a pass/fail registered in register 35. The pass/fail value is provided when the decipher is complete to allow forwarding or to cause discard of the packet accordingly.

If the UDP checksum passes, all the tunnel/IPSEC headers and trailers are stripped off the packet and the raw packet is forwarded.

The advantages of this proposal are that as fast as the packet is decoded, the checksum is also being verified, thus overcoming the throughput and/or latency problems with the prior art and avoiding extra memory. For example the main performance indicator for VPNs is the number of tunnels that can be terminated per second. Latency is becoming increasingly important too with the use of VPNs for voice and delay sensitive traffic.

This proposal is mainly applicable to L2TP/IPSEC a widely used tunneling protocol but can also be used in any tunneling protocol which uses UDP and security e.g. enciphered IP over UDP used to traverse NAT.

What is claimed is:

1. A method of decoding a data packet which conforms to an internetworking protocol and encapsulates by means of an encapsulation security protocol an enciphered UDP datagram which includes an UDP header and a payload, the data packet having an network protocol header and a security protocol header, comprising:
    obtaining from said network protocol header an network protocol source address, an network protocol destination address and a network protocol identification;
    commencing a decipher of said enciphered UDP datagram;
    obtaining at the commencement of the decipher a length field from said UDP header;
    establishing a pseudo-header for inclusion in a UDP checksum, said pseudo-header including said network protocol source address, said network protocol destination address, said network protocol identification and said length field;
    continuing the decipher of said enciphered UDP datagram in parallel with computing said UDP checksum; and
    accepting or rejecting said data packet after examination of said UDP checksum.

2. A method as in claim 1 wherein said enciphered UDP datagram includes a tunneling protocol header.

3. A method of decoding a data packet which conforms to IP and encapsulates by means of an ESP protocol an enciphered UDP datagram which includes an UDP header and a payload, said data packet having an IP header and an IP ESP header, comprising:
    obtaining from said IP header an IP source address, an IP destination address and a protocol identification;
    commencing a decipher of said UDP datagram;
    obtaining at the commencement of said decipher a length field from said UDP header;
    establishing a pseudo-header for inclusion in a UDP checksum from said IP source address, said IP destination address, said protocol identification and said length field;
    continuing the decipher of said UDP datagram while in parallel with computing said UDP checksum on said UDP datagram and said pseudo-header; and
    accepting or rejecting said data packet after an examination of said UDP checksum.

4. A method as in claim 3 wherein said enciphered UDP datagram includes a tunneling protocol header.

5. A method as in claim 4 wherein said tunneling protocol is Layer 2 Tunneling Protocol (L2TP).

6. A receiver for a data packet which conforms to an internetworking protocol and encapsulates by means of an encapsulation security protocol an enciphered UDP datagram which includes an UDP header and a payload, the data packet having an network protocol header and a security protocol header, comprising:
    a memory for said data packet;
    a decipher block;
    a checksum verifier;
    a controller which reads said data packet in segments to said decipher block;
    wherein
        said decipher block allows the passage of said network protocol header and a security protocol header before commencing a decipher;
        said checksum verifier establishes a pseudo-header composed of fields partly from said network protocol header and partly from said UDP header as deciphered; and
        said checksum verifier computes a checksum on the whole of said UDP datagram and said pseudo-header in parallel with said cipher block completes completing said decipher.

7. A receiver as in claim 6 wherein said controller inhibits said decipher by said decipher block until an enciphered portion corresponding to said UDP header is reached.

8. A receiver for a data packet which conforms to an internetworking protocol and encapsulates by means of an encapsulation security protocol an enciphered UDP datagram which includes an UDP header and a payload, the data packet having an network protocol header and a security protocol header, comprising:
    a memory for said data packet;
    a decipher block coupled to said memory;
    a checksum verifier coupled to said decipher block; and
    a controller which transfers said data packet in segments to said decipher block;

wherein said decipher block is organized to allow the passage of said network protocol header and a security protocol header before commencing a decipher; and said checksum verifier is operable in response to the reception of said UDP header as deciphered to compute a checksum in parallel with the deciphering of said UDP datagram by said decipher block.

9. A receiver as in claim 8 wherein said checksum verifier is organized:

(a) to establish a pseudo-header composed of fields partly from said network protocol header and partly from said UDP header as deciphered; and (b) to compute said checksum on the whole of said UDP datagram and said pseudo-header while said cipher block completes said decipher.

* * * * *

UNITED STATES PATENT AND TRADEMARK OFFICE
CERTIFICATE OF CORRECTION

| | | |
|---|---|---|
| PATENT NO. | : 7,843,910 B2 | Page 1 of 1 |
| APPLICATION NO. | : 11/069798 | |
| DATED | : November 30, 2010 | |
| INVENTOR(S) | : Kevin Loughran et al. | |

It is certified that error appears in the above-identified patent and that said Letters Patent is hereby corrected as shown below:

In column 6, line 19, in Claim 3, after "datagram" delete "while".

In column 6, line 51, in Claim 6, after "block" delete "completes".

Signed and Sealed this
Eleventh Day of September, 2012

David J. Kappos
*Director of the United States Patent and Trademark Office*